(12) United States Patent
Rooney

(10) Patent No.: US 10,892,612 B2
(45) Date of Patent: Jan. 12, 2021

(54) STRAND SUPPORT DEVICE

(71) Applicant: David Rooney, Penllyn, PA (US)

(72) Inventor: David Rooney, Penllyn, PA (US)

( * ) Notice: Subject to any disclaimer, the term of this patent is extended or adjusted under 35 U.S.C. 154(b) by 0 days.

(21) Appl. No.: 16/248,724

(22) Filed: Jan. 15, 2019

(65) Prior Publication Data

US 2019/0222013 A1 Jul. 18, 2019

Related U.S. Application Data

(60) Provisional application No. 62/617,392, filed on Jan. 15, 2018.

(51) Int. Cl.
| | |
|---|---|
| *H02G 7/00* | (2006.01) |
| *H02G 7/05* | (2006.01) |
| *F16L 3/08* | (2006.01) |
| *F16M 13/02* | (2006.01) |
| *H02G 3/04* | (2006.01) |

(52) U.S. Cl.
CPC ............. *H02G 7/05* (2013.01); *F16L 3/08* (2013.01); *F16M 13/02* (2013.01); *H02G 3/0456* (2013.01)

(58) Field of Classification Search
CPC .. H02G 7/05; H02G 7/06; H02G 7/08; H02G 7/10
USPC .......... 248/65, 67.7, 68.1, 73, 218.4, 219.1, 248/219.2, 219.3, 219.4, 230.1, 539
See application file for complete search history.

(56) References Cited

U.S. PATENT DOCUMENTS

| | | | | |
|---|---|---|---|---|
| 2,662,730 A * | 12/1953 | Crawford | ............ | H02G 1/02 254/134.3 PA |
| 2,791,389 A * | 5/1957 | Peltier | ............ | F16L 3/18 248/55 |
| 4,570,884 A * | 2/1986 | Armbruster | ............ | F16L 3/22 248/218.4 |
| 5,445,348 A * | 8/1995 | Caldwell | ............ | F16L 3/243 248/74.1 |
| 5,897,081 A * | 4/1999 | Dechen | ............ | H02G 1/02 174/41 |
| 6,128,960 A * | 10/2000 | DiEdwardo | ............ | G01M 7/02 73/663 |
| 6,595,477 B2 * | 7/2003 | Roberts | ............ | H01B 17/16 174/138 R |
| 10,396,537 B2 * | 8/2019 | Frank | ............ | H02G 5/025 |
| 2009/0245994 A1 * | 10/2009 | Ritola | ............ | E04H 12/34 414/774 |

* cited by examiner

*Primary Examiner* — Steven M Marsh
(74) *Attorney, Agent, or Firm* — Douglas J Ryder; Ryder, Mazzeo & Konieczny LLC

(57) ABSTRACT

A device to provide support to a support strand when a small cell is mounted thereto to limit amount of droop that occurs on the support strand when the small cell is mounted thereto. The strand support device is mounted to a telephone pole (via a suspension clamp that is mounted to the pole to secure the support strand thereto) and includes a mounting rod and a support rod that extend outward from the pole. The distance the device extends from the pole is based on the distance from the pole that the small cell is located. The device connects to the support strand in proximity to where the small cell is mounted. Connecting to the support strand rather than the small cell ensures that no damage is done to the small cell. The device may be adjustable so that it can be utilized in different situations.

8 Claims, 10 Drawing Sheets

STRAND SUPPORT DEVICE

BACKGROUND

Telephone poles are used to string various kinds of cables. The cables provide different services to customers along a route from the service providers. The types of services include power and communications. The communications cables may be provided by telephone companies, cable companies or other providers. The cables run by the various service providers may include power cables, coaxial cables, fiber optic cables, telephone cables or other types of cables. The cables for different service providers should be spaced apart from one another. The distance between the cables may be based on the type of service provided. For example, the distance between power cables may be greater than the distance between communications cables. The cables are strung between successive poles with some droop (not so tight as to be straight and have no flexibility), to allow the cables some freedom for movement to not be damaged, for example, in windy conditions. The cables may not actually be connected to the telephone poles. Rather, support strands (e.g., rigid wires) may be connected to the poles and the cables may be connected to the support strands with, for example, lashing wire.

FIG. 1 illustrates support strands and service cables being run above the ground between telephone poles 100, 105. As illustrated, three support strands 110, 120, 130 and three service cables 115, 125, 135 are run. A first support strand 110 and a first service cable 115 are highest, a second support strand 120 and a second service cable 115 are in the middle and a third support strand 130 and a third service cable 135 are lowest. The poles 100, 105 may include suspension clamps 140 mounted thereto to secure the various support strands 110, 120, 130 to the poles 100, 105. The suspension clamps 140 may be mounted to the poles 100, 105 with mounting bolts (not illustrated for ease of illustration) that pass through the poles 100, 105. The suspension clamps 140 may include a U-shaped plate (preferably with opening facing upward) or two plates mounted on the mounting bolt. The suspension clamps 140 are simply illustrated as rectangles (and do not include the specific configuration details) for ease of illustration. The suspension clamps 140 may be tightened by, for example, tightening nuts on bolts (not illustrated for ease of illustration) that pass through the two sides (or two plates). The support strands 110, 120, 130 may traverse the suspension clamps 140 between the two sides (or two plates) and be secured therein when the nuts are tightened on the bolts and secure the two sides together.

The cables 115, 125, 135 are not secured to the poles 100, 105 via the suspension clamps 140 or other means. Rather, the cables 115, 125, 135 may be secured to the support strands 110, 120, 130 between the poles 100, 105 with, for example, a lashing wire (not separately illustrated) and are free hanging around the poles 100, 105. The connection of the cables 115, 125, 135 to the support strands 110, 120, 130 may stop or start a certain distance from each side of the poles 100, 105 (this point is simply indicated by an 'X' 150, which may be the point where the lashing wire begins or is terminated).

The distance between the support strands/cables 110/115, 120/125, 130/135 may vary between successive strands and the distance between successive strands/cables may vary between poles 100, 105 as the amount of droop may vary. FIG. 1 illustrates distance between successive strands/cables being measured at a point 160 (a defined distance from the pole 100). The distance between the first strand/cable 110, 115 and the second strand/cable 120, 125 at point 160 is identified as D1. The distance between the second strand/cable 120, 125 and the third strand/cable 130, 135 at point 160 is identified as D2.

The use of wireless devices and the need for access points for connecting the wireless devices to communications networks continues to grow. Having multiple access points accessible in close proximity is important for ensuring communications is not lost. This is vital to certain applications including, but not limited to, self-driving vehicles. Accordingly, the use of smaller access points (so called "small cells") that can be located in close proximity is expanding. The small cells can be located in various locations. One proposed location is to locate the small cells on the support strands for the communications cables. As the service providers have already strung their cables they have access to the real estate required.

The weight of a small cell mounted on a support strand may cause the support strand to droop more than it typically does. The droop may be such that the small cell may come close to contacting, or actually contact, a support strand/cable below the support strand where the small cell is mounted. The below cable may be providing a different service and be operated by a different service provider. Added weight that may result from rain or snow could cause the support strand to droop more and cause the small cell to move closer to, to contact or to interfere with the cable below. The close proximity and/or contact between the small cell and the cable could possibly result in damage to the cable and/or service degradation.

FIG. 2 illustrates a small cell 200 mounted to the second strand 120 of FIG. 1 and the impact thereof. As illustrated, the small cell 200 is mounted on the second support strand 120 a certain distance from the pole 100. It should be noted that the point 150 where the cable 125 is connected to the support strand 120 with the lashing wire 150 has been moved further away from the pole 100 to a point after the small cell 200 (so that the small cell 200 is not mounted to the cable 125 as well as the strand 120). The small cell 200 causes the support strand 120 it is mounted to, based on the weight of the small cell 200, to droop. The drooping causes the distance between the first strand/cable 110, 115 and the second strand 120 at point 160 to increase to D3 (from D1) and the distance between the second strand 120 and the third strand/cable 130, 135 at point 160 to decrease to D4 (from D2). The previous distances D1 and D2 are illustrated as dashed lines for comparison. The small cell 200 may hang below the second strand 120 and may be in close proximity (or may actually contact) the third stand/cable 130, 135.

What is needed is a means for supporting the support strand when the small cell is mounted thereto so that small cell does not hang too close to the below strand/cable which may violate regulations, result in damage to the strand/cable, and/or cause service degradation.

BRIEF DESCRIPTION OF THE DRAWINGS

The features and advantages of the various embodiments will become apparent from the following detailed description in which.

DESCRIPTION

A device is proposed that can provide support to the support strand when the small cell is mounted thereto (strand support device) to limit the amount of droop that occurs on the support strand when the small cell is mounted thereto. The strand support device may be mounted to the telephone pole and extend outward therefrom. The distance that the stand support device extends from the pole is based on the distance from the pole that the small cell is mounted to the support strand. The strand support device may connect to the support strand in proximity to where the small cell is mounted on the support strand. Connecting to the support strand rather than the small cell ensures that no damage is done to the small cell. According to one embodiment, the strand support device may be adjustable so that it can be utilized in different situations. According to one embodiment, the device may be mounted onto the suspension clamp that is mounted to the pole to secure the support strand thereto.

Figure 1:
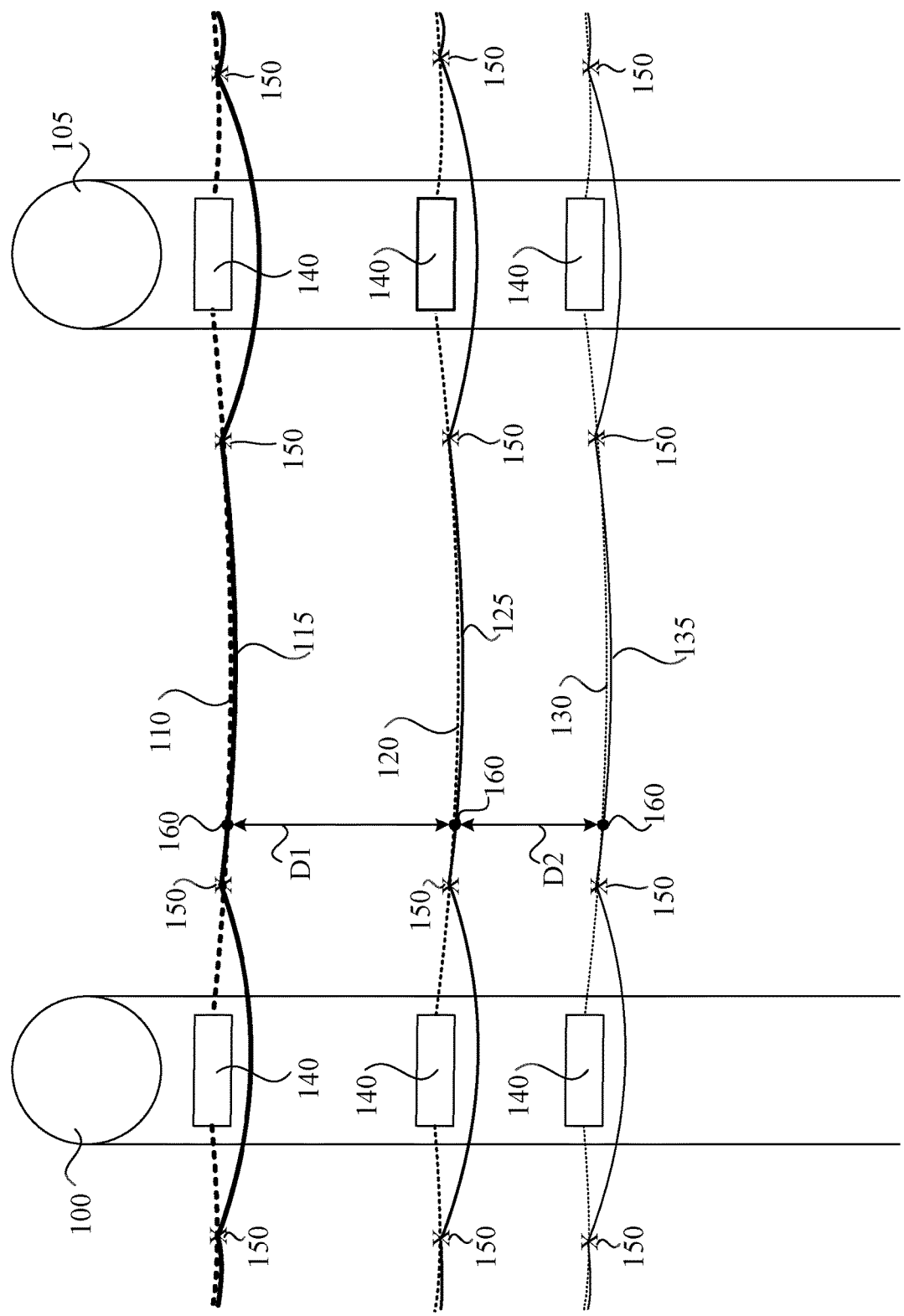
FIG. 1 illustrates support strands and service cables being run above the ground utilizing telephone poles.
Figure 2:
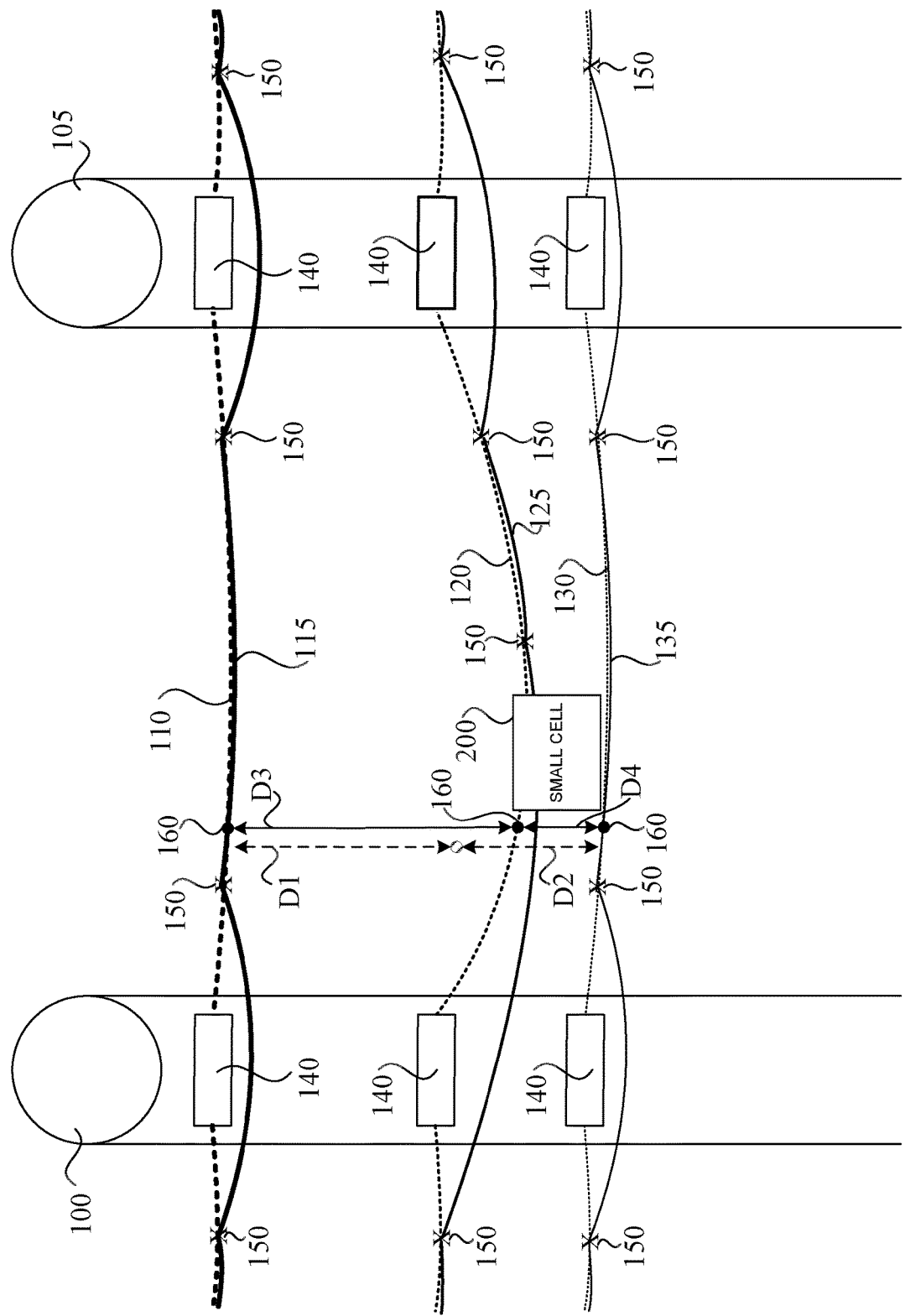
FIG. 2 illustrates a small cell mounted to the second strand of FIG. 1 and the impact thereon.
Figure 3A:
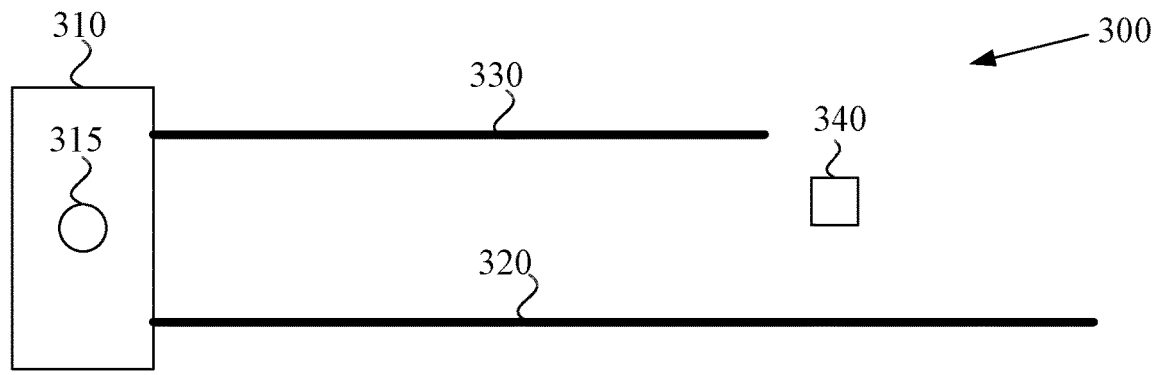
FIG. 3A-C illustrate front views of an example strand support device in various connection states, according to one embodiment.
Figure 3B:
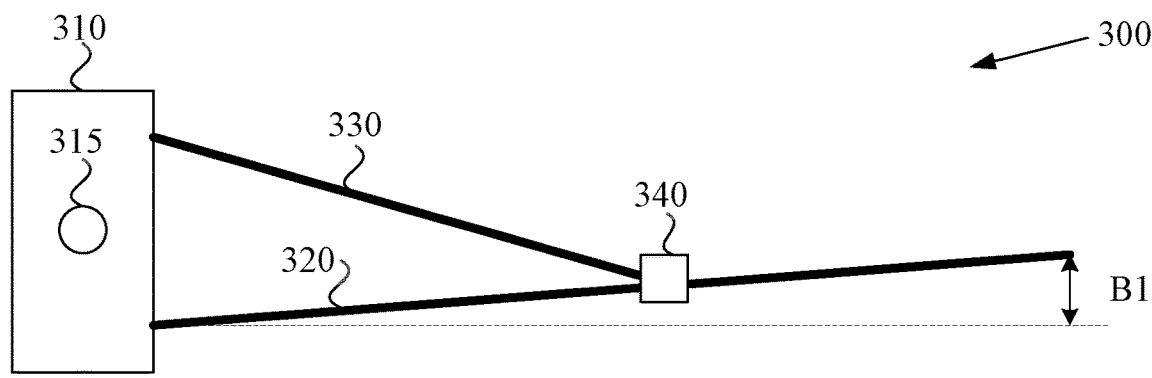
Figure 3C:
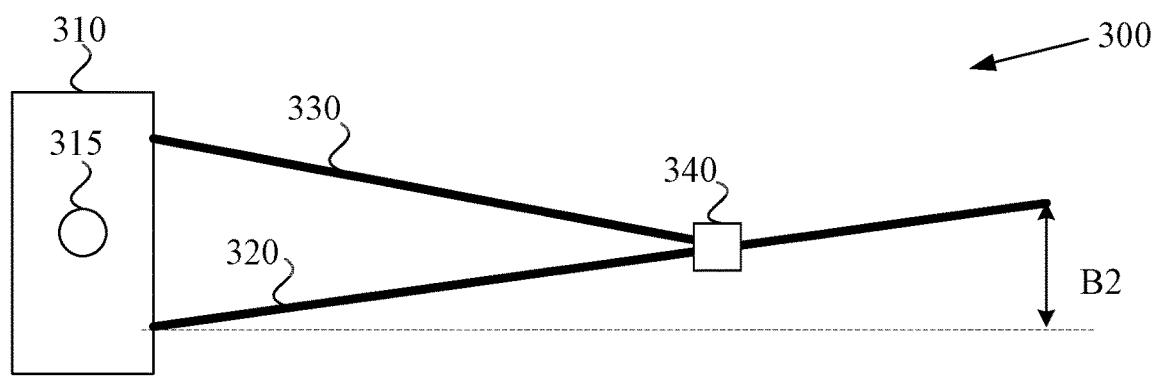

FIG. 3A-C illustrate front views of an example device for supporting the support strand (strand support device) 300 in various configurations. The strand support device 300 may include a casing 310 designed to be mounted to a telephone pole (100, 105 of FIGS. 1 and 2). The casing 310 may include a hole 315 formed therein for allowing the casing 310 to be secured to the pole with the same mounting bolt that secures a suspension clamp (140 of FIGS. 1 and 2). The suspension clamp may be removed from the pole so that the strand support device 300 may be mounted against the pole and then the suspension clamp may be remounted on top of the strand support device 300. The suspension clamp may provide additional support for the strand support device 300. The casing 310 may be made of a material that is strong enough to provide the required support and that can withstand the elements (e.g., varying temperatures, precipitation, UV light, insects) as it will be located outdoors. According to one embodiment, the casing may be made of a metal, such as steel.

The strand support device 300 may include a mounting rod 320 that extends horizontally a certain distance from the casing 310 and pole. The distance is selected based on the distance that the small cell 200 will be mounted on the support strand from the pole. The mounting rod 320 may extend from a lower portion of the casing 310. The mounting rod 320 may be made of a material that is strong enough to extend from the casing 310 and pole and provide support to the support strand. The mounting rod 320 should be capable of supporting the weight of the small cell 200 in order to limit the amount of droop in the support strand when the small cell 200 is mounted thereto. The mounting rod 320 may made of a material that can handle the elements. According to one embodiment, the mounting rod 320 may be made of a metal, such as steel.

The strand support device 300 may also include a support rod 330 that extends from the casing 310 above the mounting rod 320. The support rod 330 may be connected to the mounting rod 320 and provide support for the mounting rod 320. The support rod 330 should be capable of supporting the mounting rod 320 when the small cell 200 is mounted thereto. The support rod 330 may made of a material that can handle the elements. According to one embodiment, the support rod 330 may be made of a metal, such as steel.

The strand support device 300 may also include a connector 340 for connecting the support rod 330 and the mounting rod 320. The connector 340 may be any number of devices capable of connecting the support rod 330 and the mounting rod 320 (the connector 340 is simply illustrated as a square for ease of illustration). For example, the connector 340 could be a clamp, a hook, an adjustable shaft (e.g., condensed by tightening a bolt or nut) or the like. The connector 340 may be a free-standing component that may be adjustably secured to both the support rod 330 and the mounting rod 320. Alternatively, the connector 340 may be mounted to one of the support rod 330 and the mounting rod 320 and be adjustably secured to the other in some fashion (e.g., tightening a bolt, tightening a nut).

FIG. 3A illustrates the support rod 330 and the mounting rod 320 extending straight out of the casing 310 and not being connected. FIGS. 3B-C illustrate the support rod 330 being flexed downward and the mounting rod 320 being flexed upward so that they can be connected with the connector 340. These configurations show that the mounting rod 320 is biased upward from a straight-out position when it is connected to the support rod 330. FIG. 3B shows an upward bias of B1 and FIG. 3C shows an upward bias of B2.

According to one embodiment, the point at which the support rod 330 and the mounting rod 320 are connected together using the connector 340 may be adjusted. The adjustment may be made by moving the location the connector 340 is secured to one or both of the support rod 330 and the mounting rod 320. The location of the connector 340 may affect the bias that is provided to the mounting rod 320. For example, the closer the connector 340 is to the casing 310 the less upward bias there will be on the mounting rod 320 and the further away the connector 340 is the more upward bias there will be.

According to one embodiment, the distance that one or both of the support rod 330 and the mounting rod 320 extend from the casing 310 may be adjusted. The varying length of the support rod 330 may affect the bias that is applied to the mounting rod 320. For example, the less distance that the support rod 330 extends the more upward bias on the mounting rod 320 and the more distance that the support rod 330 extends the less upward bias. The varying length of the mounting rod 320 may be based on the location of the small cell 200.

Figure 4A:
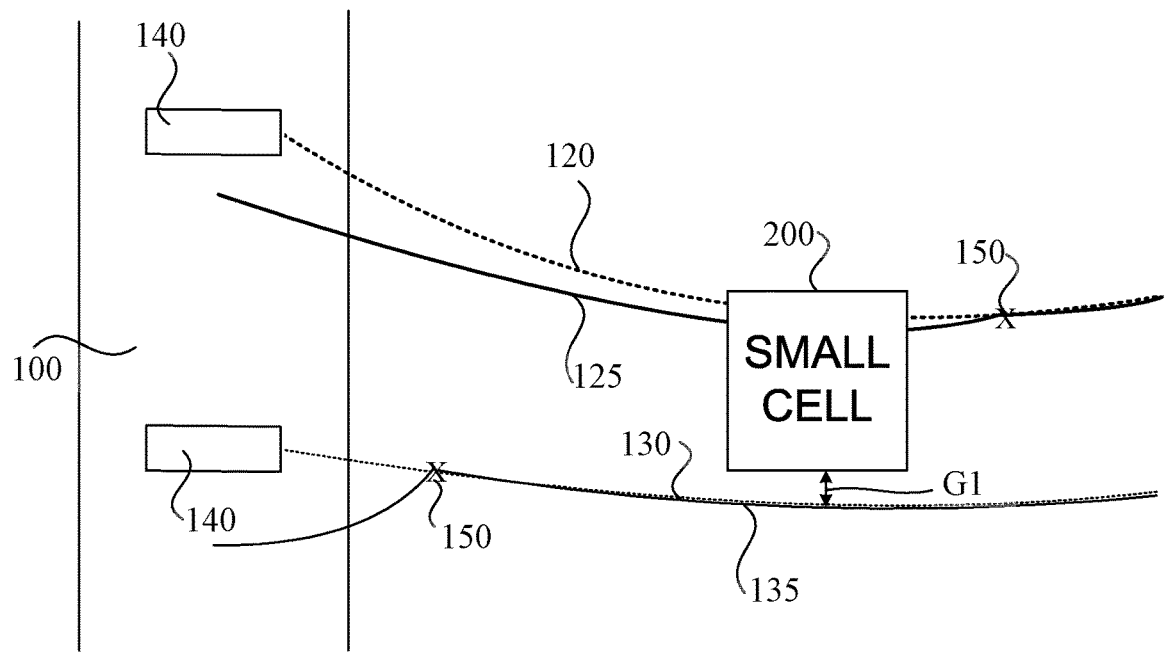
FIGS. 4A-C illustrate how a strand support device limits amount of droop in a support strand caused by a small cell being mounted thereto, according to one embodiment.
Figure 4B:
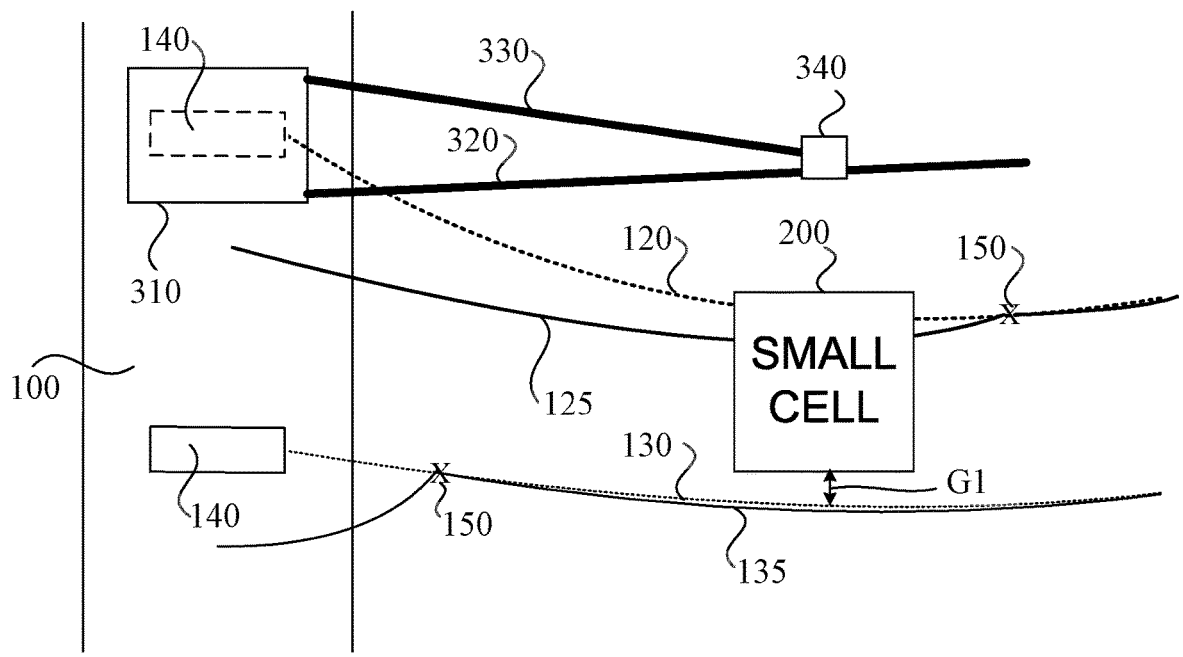
Figure 4C:
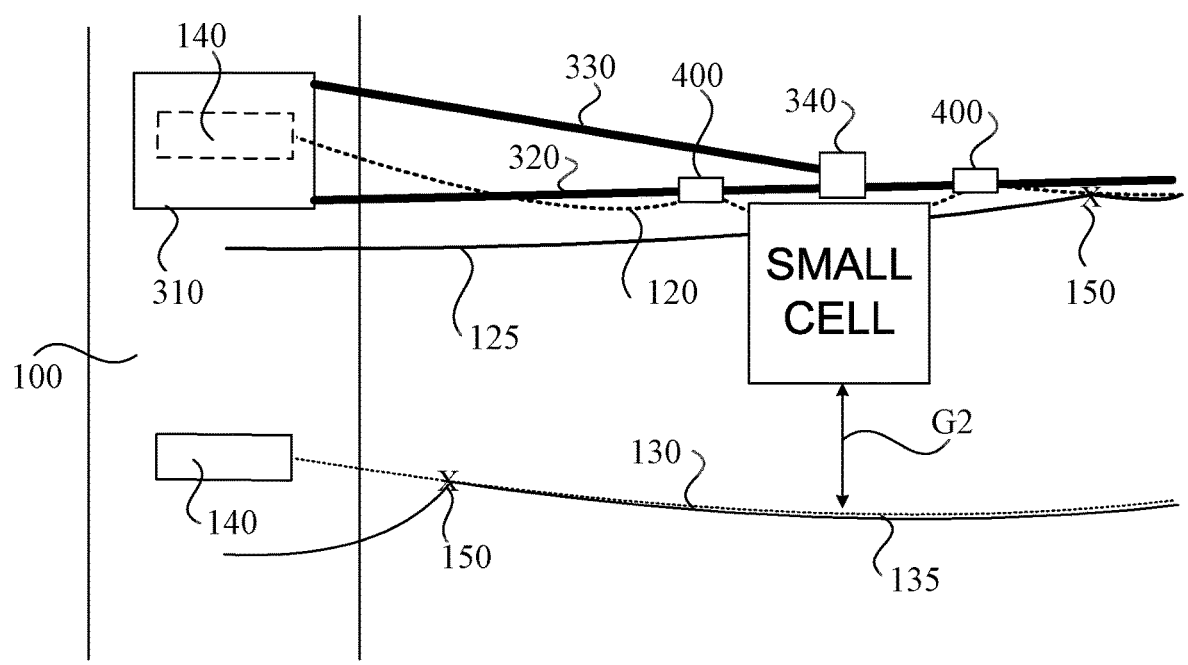

FIGS. 4A-C illustrate how the support strand device 300 limits the amount of droop in the support strand 120 caused by the small cell 200. FIG. 4A illustrates the impact of mounting the small cell 200 on the support strand 120. The support strand 120 droops such that the small cell 200 is in close proximity to the support strand/cable 130, 135 (a gap G1 is all that separates them). FIG. 4B illustrates the support strand device 300 being mounted to the pole 100 before the support stand 120 is connected thereto. The casing 310 is mounted to the pole 100 via the same bolt (not illustrated) that is used for mounting the suspension clamp 140 to the pole 100. As previously noted, the suspension clamp 140 may be removed so the casing 310 can be located closer to the pole 100 and then the suspension clamp 140 may be secured back on. The mounting rod 320 extends past the small cell 200 and the supporting rod 330 is connected thereto with the connector 340. As illustrated, the connector 340 is located so as to be centered on the small cell 200 but is in no way limited thereto.

FIG. 4C illustrates the support strand 120 being connected to the mounting rod 320. The support strand 120 is connected to the mounting rod 320 via a plurality of connectors 400 (two illustrated, one before and one after the small cell 200). The support strand is in no way limited by the number or location of the connectors 400. The connectors 400 may be any number of devices capable of connecting the support strand 120 to the mounting rod 320 (the connectors 400 are simply illustrated as squares for ease of illustration). For example, the connectors 400 could be clamps, hooks or the like. According to one embodiment, the connectors 400 may be free standing components that may be adjustably secured to both the support strand 120 and the mounting rod 320. Alternatively, the connectors 400 may be mounted to one of the mounting rod 320 or the support stand 120 and then be adjustably secured to the other one.

According to one embodiment, the connectors 400 may be nuts that are permanently secured to the mounting rod 320 and the support strand 120 may be secured to the nuts in some fashion. For example, suspension clamps may be secured to the support strand 120 at appropriate locations and the suspension clamps may be secured to the connectors 400 by passing the bolts used to tighten the suspension clamps through the connectors 400 and then securing the bolts therein with nuts.

As illustrated in FIG. 4C, when the support strand 120 is connected to the mounting rod 320 the mounting rod 320 may be pulled downward to some degree. The support strand 120 and the small cell 200 may be pulled upward as the droop may be reduced. As illustrated, the gap between the small cell 200 and the support strand/cable 130, 135 has increased to G2.

The support strand device 400 may be adjusted once it is installed based on variations that may be encountered. For example, if the support strand 120 still droops too much after it is connected to the device 300, the device 300 may be adjusted so as to further bias the mounting rod 320 upward. The manner in which the bias is adjusted may depend on the exact configuration of the device 300. If the small cell 200 is located closer to (or further from) the pole 100 than is typical the distance that the mounting rod 320 extends from the casing 310 may be decreased (or increased).

Figure 5A:
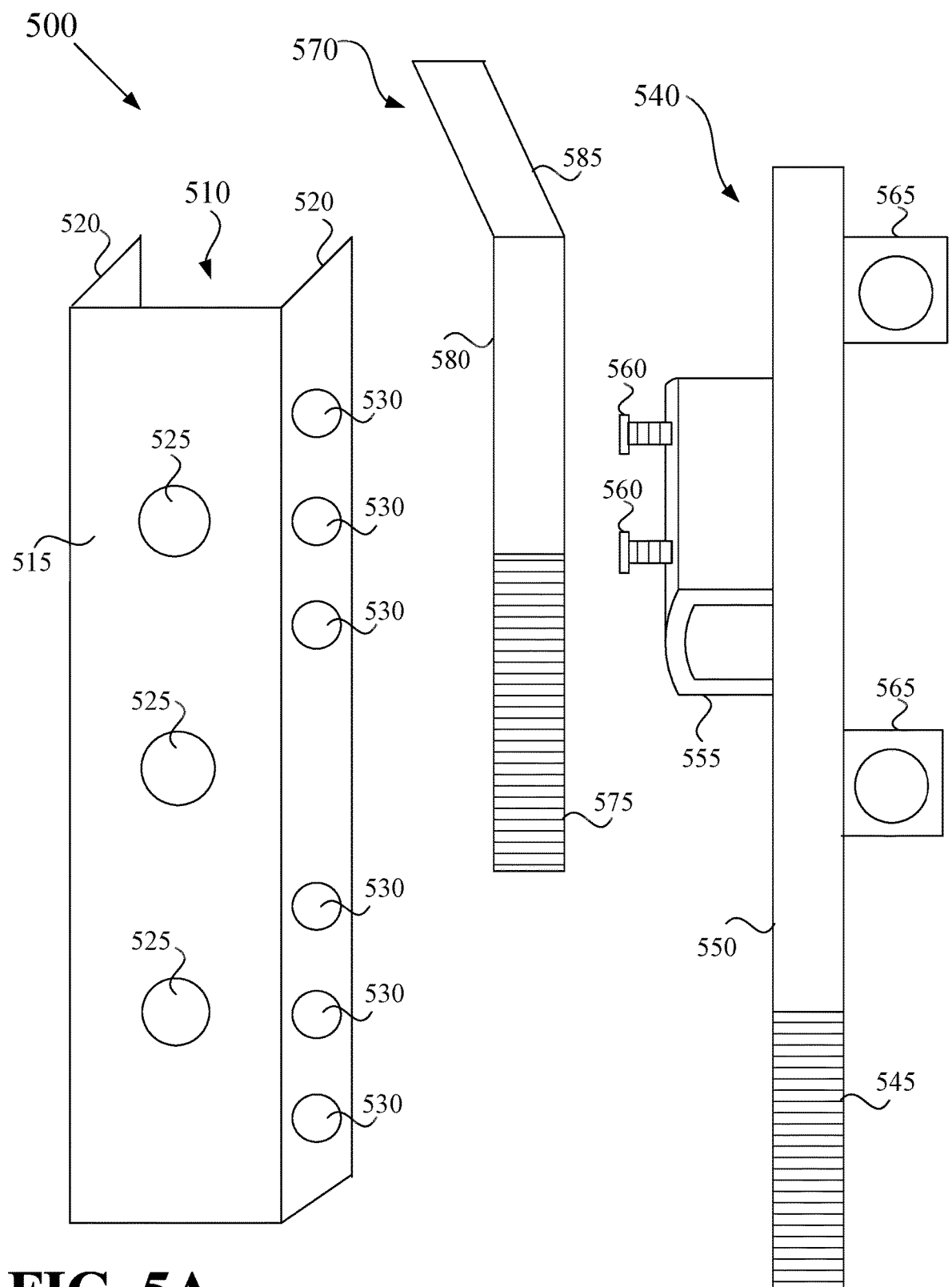
FIG. 5A illustrates an exploded view of an example strand support device, according to one embodiment.

FIG. 5A-D illustrate several views of an example support strand device 500. FIG. 5A illustrates the various components of the device 500 unassembled. The device 500 may include a casing 510, a mounting rod 540 and a support rod 570. The casing 510 may include a front face 515 and sides 520. The front face 515 may include a plurality of holes 525 (3 illustrated but not limited thereto) for receiving the mounting bolt. The ability to mount the casing 510 at different locations on the pole provides flexibility in the configuration based on parameters that may be encountered in the field. The sides 520 may include a plurality of holes 530 for the mounting rod 540 and the support rod 580 to. The ability to secure the rods 540, 580 to different locations on the casing 510 provides flexibility in the configuration based on parameters that may be encountered in the field.

This flexibility enables the strand support device 500 to be adjusted based on variations that may be encountered during installation of a small cell in the field, including but not limited to, type of line the small cell is being mounted to, distance between the communication line and the line below, size of the small cell, distance the small cell is located from the pole and droop caused by the small cell.

The mounting rod 540 includes a threaded portion 545 and a non threaded portion 550. The threaded portion 545 is on one side and is used to secure the mounting rod 540 to the casing 510. The threaded portion 545 may pass through aligned holes 530 in the sides 520 and be secured thereto with bolts 590. The distance that the mounting rod 540 extends from the casing 510 in the direction of where the small cell 200 is mounted may be adjusted.

The non threaded portion 550 may include a connector 555 mounted to an upper side thereof. The connector 555 may be secured to the mounting rod 540 in various means including, for example, welding. The connector 555 may be to receive the support rod 570. As illustrated, the connector 555 is, for example, a tube for allowing a portion of the support rod 570 to be received therein or pass therethrough. The connector 555 is not limited to the tube illustrated. The connector 555 may include one of more tightening devices 560 to secure the support rod 570 therein once received. The tightening devices 560 may be set crews, bolts, clamps or other devices that could secure the support rod 570 within the connector 555.

The non threaded portion 550 may include a plurality of connectors 565 (2 illustrated) mounted to a lower side thereof. The number of connectors is not limited to the two illustrated or any specific number. The connectors 565 may be secured to the mounting rod 540 in various means including, for example, welding. As illustrated, the connectors 565 are simply nuts that can be used to secure a support strand thereto. The connectors 565 are in no way limited to nuts as illustrated.

The support rod 570 includes a threaded portion 575 and a non threaded portion 580. The threaded portion 575 is on one side and is used to secure the support rod 570 to the casing 510. The threaded portion 575 may be the same size as the threaded portion 545 or may be different (longer or shorter). The threaded portion 575 may pass through aligned holes 530 in the sides 520 and be secured thereto with bolts 590. The distance that the support rod 570 extends from the casing 510 in the direction of where the small cell 200 is mounted may be adjusted. The non threaded portion 580 may have an angled end 585 opposite the threaded portion 575. The angled end 585 is to enable the support rod 570 to be received in the connector 555. The angled end 585 may be substantially the same size as the connector 555 but is not limited thereto.

Figure 5B:
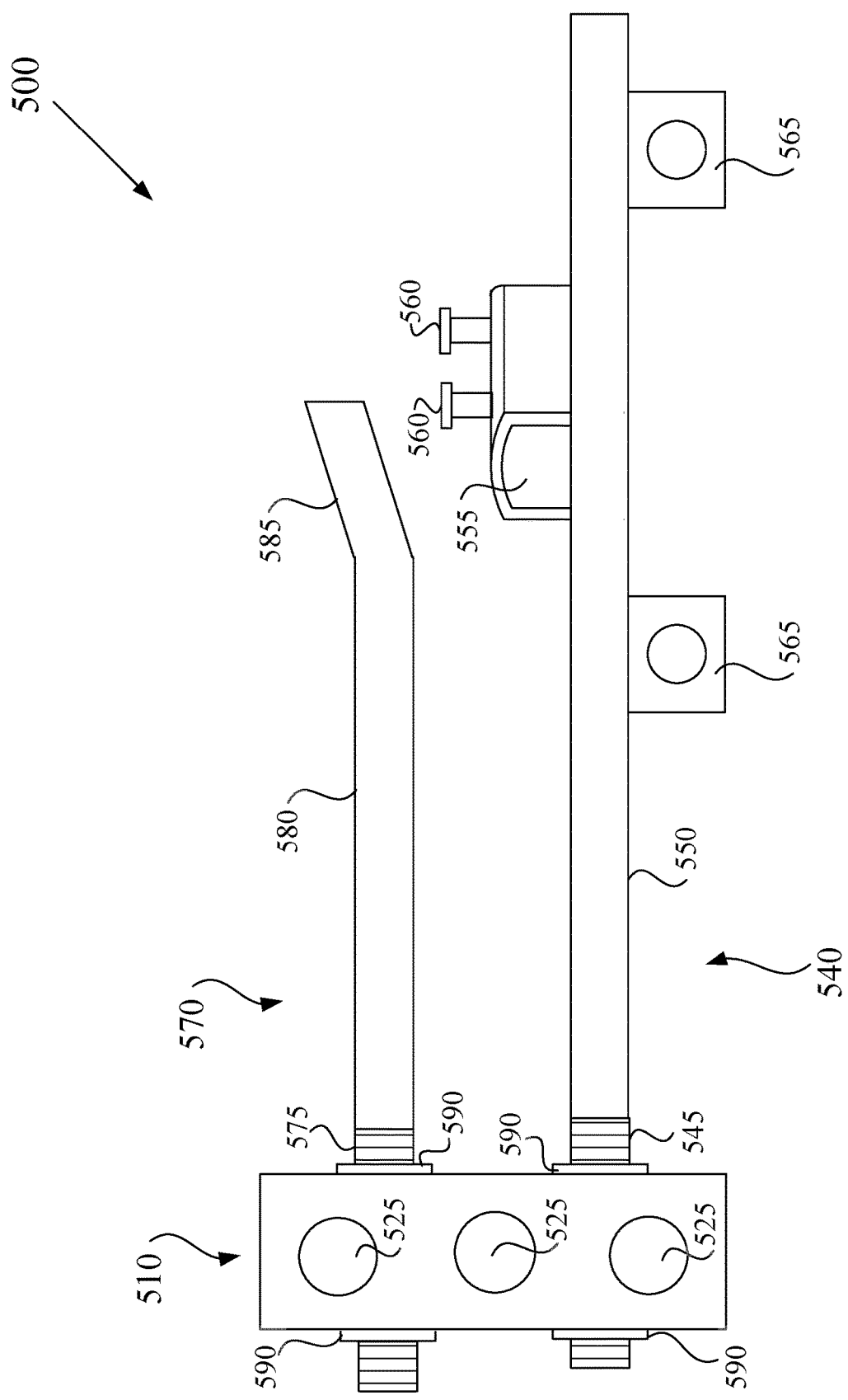
FIGS. 5B-D illustrate front views of an example strand support device in various connection states, according to one embodiment.

FIG. 5B illustrates the mounting rod 540 and the support rod 570 secured to the casing 510 and extending straight out. As illustrated, the mounting rod 540 is extending further than the support rod 570 as indicated by the fact that more threaded portion 575 extends from the far side of the casing 510 than the threaded portion 545.

Figure 5C:
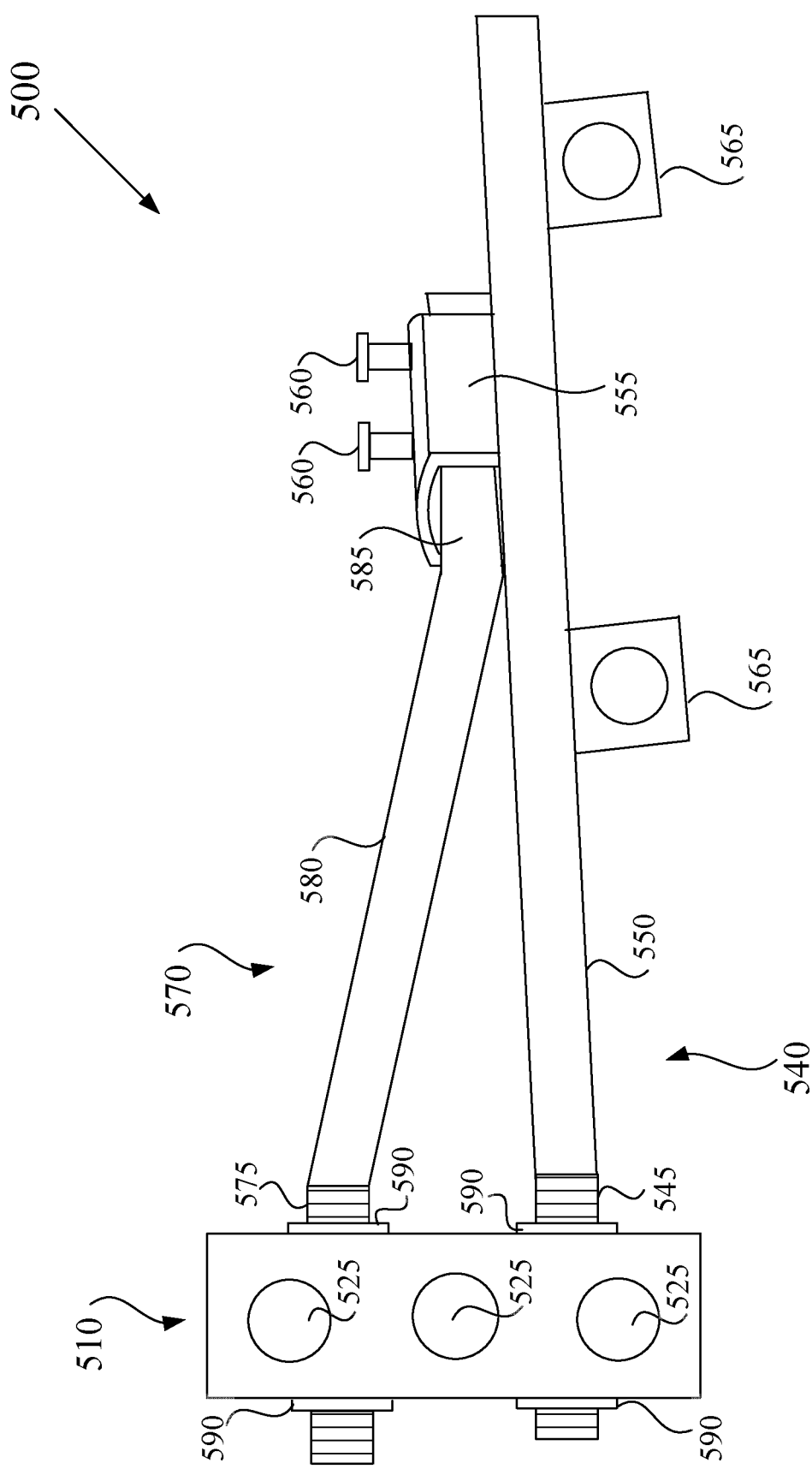

FIG. 5C illustrates the device 500 in a configuration where the mounting rod 540 and the support rod 570 are flexed inward and secured together. The mounting rod 540 and the support rod 570 are secured together by placing the angled end 585 within the connector 555 and tightening the tightening devices 560 to secure the angled end 585 therewithin.

Figure 5D:
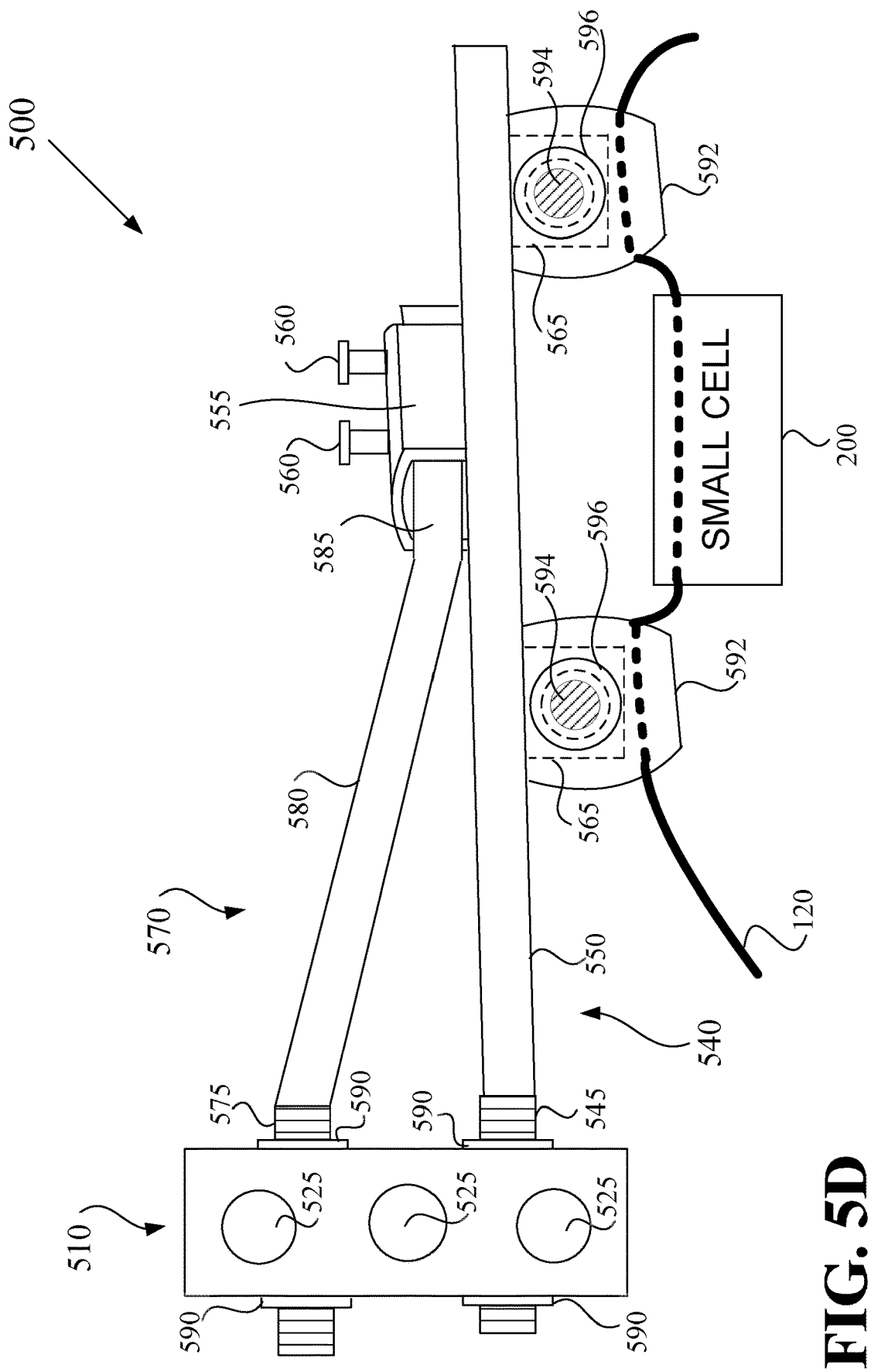

FIG. 5D illustrates the device 500 in a configuration where the support strand 120 holding the small cell 200 is mounted thereto. As illustrated, when the support strand 120 is connected thereto, the mounting rod 540 and the support rod 570 are flexed downward based on the weight of the small cell 200. However, the use of the device 500 reduces the droop in the support strand 120 (an example of this was illustrated in FIG. 4C where the droop was significantly reduced from FIGS. 4A-B). As illustrated, the support strand 120 is connected to the mounting rod 540 using suspension clamps 592. The suspension clamps 592 are wrapped around the support strand 120 and then the bolt 594 that is used to tighten the suspension clamp 592 is passed through the hole (not separately labeled) in the connector 565 and the nut 596 is then placed thereon. The nut 596 and bolt 594 thus secure the suspension clamp 592 to the connector 565 as well as tighten the suspension clamp 592 and secure the strand 120 therewithin.

The connection of the support strand 120 to the connectors 565 is in no way limited to the use of suspension clamps 592 as illustrated. Rather any number of other means could be used to connect the support strand 120 to the connectors 565 without departing from the current scope. For example, various types of connectors, clamps, hooks or the like could be utilized. According to a preferred embodiment, a connection that is secured to the support stand 120 is preferred to avoid a situation where the support strand 120 moves within the connection and allows for the droop to occur.

FIGS. 5A-D illustrated an embodiment where the connector 555 used to secure the mounting rod 540 and the support rod 570 is secured to the mounting rod 540 and receives the support rod 570. According to an alternative embodiment, the connector 555 may be secured to the support rod 570 and may receive the mounting rod 540. In this alternative configuration, at least a portion of the mounting rod 540 would pass through the connector 555 and would be secured within the connector 555 at the appropriate position by tightening the tightening devices 560.

Figure 6A:
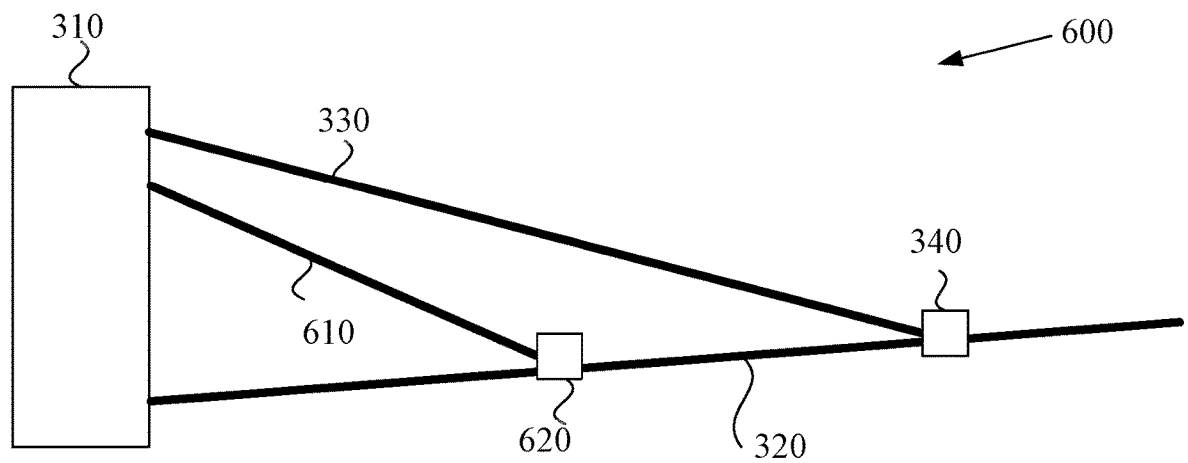
FIGS. 6A-B illustrate front views of example strand support devices, according to alternative embodiments.

FIG. 6A illustrates an alternative embodiment of a strand support device 600. As the device 600 is similar to the device illustrated in FIGS. 3A-C like elements will be identified with the same identification numbers. The device 600 may include an additional support rod 610 to provide additional support and flexibility in the biasing of the mounting rod 320. The second support rod 610 may be located between the first support rod 330 and the mounting rod 320 on the casing 310. The second support rod 610 may connect to the mounting rod 320 closer to the casing 310 than the first support rod 330. The second support rod 610 may connect to the mounting rod 320 with a connector 620 (simply illustrated as a box). The connector 620 may be the same as the connector 340 but need not be.

Figure 6B:
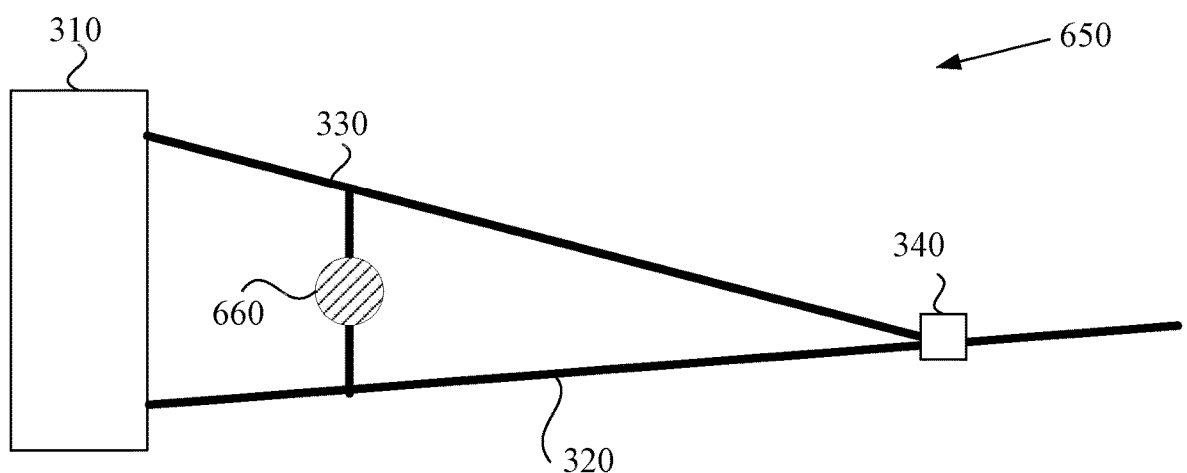

FIG. 6B illustrates an alternative embodiment of a strand support device 650. As the device 650 is similar to the device illustrated in FIGS. 3A-C like elements will be identified with the same identification numbers. The device 650 may include an adjustable clamp 660 (simply illustrated as a dot between two bars) moveably connected to the support rod 330 and the mounting rod 320 that can be secured in place at any position between the casing 310 and the connector 340.

While the device has been described as providing support to a support strand when a small cell is mounted thereto it is not limited thereto. Rather, the device could be used to support a support strand when any device is mounted thereto. Furthermore, the device is not limited to supporting support strands. Rather, it may be utilized to support cables or other devices without departing from the current scope.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A small cell mounted to a communications cable support strand, wherein a strand support device is mounted to a telephone pole to provide support to the support strand, the device comprising
    a casing for securing to the telephone pole;
    a mounting rod extending substantially horizontally from the casing;
    a support rod extending substantially horizontally from the casing; and
    a connector for securing the support rod to the mounting rod, wherein the support strand is secured to the device to limit the amount of drooping in the support strand caused by the small cell.

2. The device of claim 1, wherein the connector is mounted to the mounting rod and is to receive an end of the support rod.

3. The device of claim 1, wherein the casing includes a hole in a face plate thereof for receiving a mounting bolt.

4. The device of claim 1, wherein the mounting rod includes one or more connectors for securing the support strand thereto.

5. The device of claim 4, wherein the support strand is connected to the one or more connectors using compression clamps.

6. The device of claim 1, wherein the casing includes a plurality of holes traversing therethrough and the location of the mounting rod and the support rod is selected by the holes they pass through.

7. The device of claim 1, wherein the casing includes a plurality of holes in a face plate thereof for receiving a mounting bolt, wherein a location of the device on the pole is adjustable based on the hole utilized.

8. The device of claim 1, wherein the support rod and the mounting rod include threaded portions that pass through the casing, wherein length of the support rod and the mounting rod can be adjusted by moving the location of bolts that are located on the threaded portion on each side of the casing.

* * * * *